United States Patent
Menyo (10) Patent No.: US 11,535,686 B2
(45) Date of Patent: Dec. 27, 2022

(54) TOUGH, HIGH TEMPERATURE POLYMERS PRODUCED BY STEREOLITHOGRAPHY

(71) Applicant: Carbon, Inc., Redwood City, CA (US)

(72) Inventor: Matthew S. Menyo, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 275 days.

(21) Appl. No.: 16/490,281

(22) PCT Filed: Mar. 6, 2018

(86) PCT No.: PCT/US2018/021042
§ 371 (c)(1),
(2) Date: Aug. 30, 2019

(87) PCT Pub. No.: WO2018/165090
PCT Pub. Date: Sep. 13, 2018

(65) Prior Publication Data
US 2020/0070407 A1  Mar. 5, 2020

Related U.S. Application Data

(60) Provisional application No. 62/574,808, filed on Oct. 20, 2017, provisional application No. 62/469,179, filed on Mar. 9, 2017.

(51) Int. Cl.
| | |
|---|---|
| *C08F 2/48* | (2006.01) |
| *B33Y 10/00* | (2015.01) |
| *B33Y 40/00* | (2020.01) |
| *B33Y 70/00* | (2020.01) |
| *B29C 64/124* | (2017.01) |

(Continued)

(52) U.S. Cl.
CPC .............. *C08F 2/48* (2013.01); *B29C 64/124* (2017.08); *B29C 64/35* (2017.08); *B33Y 10/00* (2014.12); *B33Y 40/00* (2014.12); *B33Y 70/00* (2014.12); *C08L 63/00* (2013.01); *B29K 2071/00* (2013.01)

(58) Field of Classification Search
CPC ....... B29C 64/124; B29C 64/35; B33Y 10/00; B33Y 40/00; B33Y 70/00; C08L 63/00
See application file for complete search history.

(56) References Cited

U.S. PATENT DOCUMENTS

| | | |
|---|---|---|
| 5,236,637 A | 8/1993 | Hull |
| 5,264,061 A | 11/1993 | Juskey et al. |

(Continued)

FOREIGN PATENT DOCUMENTS

| | | |
|---|---|---|
| CN | 103571211 | 2/2014 |
| EP | 0442071 | 8/1991 |

(Continued)

OTHER PUBLICATIONS

Park et al. "UV- and thermal-curing behaviors or dual-curable adhesives based on epoxy acrylate oligomers" International Journal of Adhesion and Adhesives, 29(7): 710-717 (2009).

(Continued)

*Primary Examiner* — Larry W Thrower
(74) *Attorney, Agent, or Firm* — Myers Bigel, P.A.

(57) ABSTRACT

The present invention concerns methods of forming a three-dimensional object, and polymerizable liquids such as dual cure resins useful for making a three-dimensional object by sterolithography, such as by continuous liquid interface production (CLIP).

19 Claims, 1 Drawing Sheet

(51) Int. Cl.
*B29C 64/35* (2017.01)
*C08L 63/00* (2006.01)
*B29K 71/00* (2006.01)

(56) References Cited

U.S. PATENT DOCUMENTS

| | | | |
|---|---|---|---|
| 5,391,072 | A | 2/1995 | Lawton et al. |
| 5,418,112 | A | 5/1995 | Mirle et al. |
| 5,529,473 | A | 6/1996 | Lawton et al. |
| 5,629,133 | A | 5/1997 | Wolf et al. |
| 5,674,921 | A | 10/1997 | Regula et al. |
| 5,679,719 | A | 10/1997 | Klemarczyk et al. |
| 5,695,708 | A | 12/1997 | Karp et al. |
| 6,309,797 | B1 | 10/2001 | Grinevich et al. |
| 7,438,846 | B2 | 10/2008 | John |
| 7,892,474 | B2 | 2/2011 | Shkolnik et al. |
| 8,110,135 | B2 | 2/2012 | El-Siblani |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,708,440 | B2 | 7/2017 | Das et al. |
| 9,777,097 | B2 | 10/2017 | Liu et al. |
| 9,982,164 | B2 | 5/2018 | Rolland et al. |
| 10,155,882 | B2 | 12/2018 | Rolland et al. |
| 10,240,066 | B2 | 3/2019 | Rolland et al. |
| 2003/0091833 | A1 | 5/2003 | Baumgart et al. |
| 2004/0052966 | A1 | 3/2004 | Wilke et al. |
| 2004/0187714 | A1 | 9/2004 | Napadensky |
| 2007/0178133 | A1 | 8/2007 | Rolland |
| 2007/0205528 | A1 | 9/2007 | Patel et al. |
| 2008/0131692 | A1 | 6/2008 | Rolland et al. |
| 2010/0105794 | A1 | 4/2010 | Dietliker et al. |
| 2012/0007287 | A1 | 1/2012 | Vermeer et al. |
| 2012/0195994 | A1 | 8/2012 | El-Siblani et al. |
| 2013/0292862 | A1 | 11/2013 | Joyce |
| 2013/0295212 | A1 | 11/2013 | Chen et al. |
| 2015/0322291 | A1 | 11/2015 | Salviato et al. |
| 2016/0016077 | A1 | 1/2016 | Yokota et al. |
| 2016/0136889 | A1 | 5/2016 | Rolland et al. |
| 2016/0137838 | A1 | 5/2016 | Rolland et al. |
| 2017/0050377 | A1* | 2/2017 | Gelbart ................. B29C 64/153 |
| 2019/0010343 | A1 | 1/2019 | Menyo et al. |

FOREIGN PATENT DOCUMENTS

| | | |
|---|---|---|
| EP | 0525578 | 2/1993 |
| EP | 0562826 | 9/1993 |
| EP | 0830641 | 3/1998 |
| EP | 1341039 | 9/2003 |
| EP | 1918316 | 5/2008 |
| EP | 2224874 | 9/2010 |
| JP | H02111528 | 4/1990 |
| JP | H09-194540 | 7/1997 |
| JP | 2000-007641 | 1/2000 |
| WO | 92/07705 | 5/1992 |
| WO | 96/00412 | 1/1996 |
| WO | 2001/026023 | 4/2001 |
| WO | 2006/045002 | 4/2006 |
| WO | 2015/077419 | 5/2015 |
| WO | 2015/200173 | 12/2015 |
| WO | 2015/200179 | 12/2015 |
| WO | 2016/007495 | 1/2016 |
| WO | 2016/126796 | 8/2016 |

OTHER PUBLICATIONS

Malik et al. "A thermally reworkable UV curable acrylic adhesive prototype" International Journal of Adhesion & Adhesives, 22: 283-289 (2002).

Malik et al. "Thermally Controlled Molecular Disassembly of a Crosslinked Polymer Network by the Incorporation of Sterically Hindered Urea Linkages" Journal of Applied Polymer Science, 85: 856-864 (2002).

Malik et al. "The thermally controlled molecular disassembly properties of a polymer network via the incorporation of one sterically hindered urea linkage" Polymer Degradation and Stability, 76: 241-249 (2002).

Malik et al. "Computational study of thermally controlled polymer network disassembly via the incorporation of sterically hindered urea linkages" Polymer, 43: 2561-2567 (2002).

Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).

Tumbleston et al, Continuous liquid interface production of 3D objects, Science, vol. 347, issue 6228, 2015, pp. 1349-1352.

Janusziewcz et al, Layerless fabrication with continuous liquid interface production, Proceedings of the National Academy of Sciences USA, vol. 113, No. 42, 2016, pp. 11703-11708.

International Search Report and Written Opinion corresponding to PCT/US2018/021042(dated May 17, 2018) (13 pages).

\* cited by examiner

TOUGH, HIGH TEMPERATURE POLYMERS PRODUCED BY STEREOLITHOGRAPHY

CROSS REFERENCE TO RELATED APPLICATIONS

This application is a 35 U.S.C. § 371 national phase application of International Application Serial No. PCT/US2018/021042, filed Mar. 6, 2018, which claims the benefit of U.S. provisional patent application Ser. Nos. 62/469,179, and 62/574,808, filed Mar. 9, 2017, and Oct. 20, 2017, respectively, the disclosures of which are incorporated by reference herein in its entirety.

FIELD OF THE INVENTION

The present invention concerns polymerizable liquids, polymer compositions formed therefrom, and methods of making such polymer compositions, preferably in the form of shaped three-dimensional objects by additive manufacturing techniques such as continuous liquid interface production.

BACKGROUND OF THE INVENTION

In conventional additive or three-dimensional fabrication techniques, construction of a three-dimensional object is performed in a step-wise or layer-by-layer manner. Typically, layer formation is performed through solidification of photo curable resin under the action of visible or UV light irradiation. Generally referred to as "stereolithography," two particular techniques are known: one in which new layers are formed at the top surface of the growing object; the other in which new layers are formed at the bottom surface of the growing object. Examples of such methods include those given in U.S. Pat. No. 5,236,637 to Hull (see, e.g., FIGS. 3-4), U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al.

Recently, techniques referred to as "continuous liquid interface production" (or "CLIP") have been developed. These techniques enable the rapid production of three-dimensional objects in a layerless manner, by which the parts may have desirable structural and mechanical properties. See, e.g., J. DeSimone et al., PCT Application Nos. PCT/US2014/015486 (published as U.S. Pat. No. 9,211,678); PCT/US2014/015506 (published as U.S. Pat. No. 9,205,601), PCT/US2014/015497 (published as U.S. Pat. No. 9,216,546), J. Tumbleston, et al., *Continuous liquid interface production of 3D Objects*, Science 347, 1349-1352 (published online 16 Mar. 2015), and R. Janusziewcz et al., Layerless fabrication with continuous liquid interface production, *Proc. Natl. Acad. Sci. USA* 113, 11703-11708 (Oct. 18, 2016).

More recently, dual cure stereolithography resins suitable for stereolithography techniques (particularly for CLIP) are described in J. Rolland et al., U.S. Pat. No. 9,453,142, and US Patent Application Publication Nos. US 2016/0136889, US 2016/0137838 and US 2016/016077. These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

These two developments have spurred the application of additive manufacturing processes beyond the manufacture of (primarily) prototype objects, to functional objects more suited to a variety of end uses. This has, however, created a variety of new technical problems requiring solution. For example, high viscosity polymerizable liquids can be difficult to rapidly form into a three-dimensional object in additive manufacturing steps such as CLIP. On the other hand, low viscosity polymerizable liquids can—in at least some situations—form low strength or fragile intermediate objects that are difficult to carry through the entire additive manufacturing process, and/or are susceptible to damage up until their further cure. Further confounding these problems, low viscosity components in an intermediate object that otherwise has adequate "green" strength can result—after further cure—in a final product with poor mechanical properties. Accordingly, there is a need for new approaches to additive manufacturing, particularly when functional three-dimensional objects are produced.

SUMMARY OF THE INVENTION

A first aspect of the present invention is a method of forming a three-dimensional object (e.g., a rigid object), comprising:

(a) providing a polymerizable liquid (or "resin") comprising a mixture of (i) a light polymerizable first component, (ii) a second solidifiable component that is different from the first component, and (iii) an organic diluent (e.g., a light-reactive organic diluent) in an amount sufficient to reduce the viscosity of the polymerizable liquid, and (iv) optionally, but in some embodiments preferably, a toughener (e.g., a core-shell rubber, a thermoplastic toughener, etc., including combinations thereof), preferably in an amount of from about 5 or 10 to 20, 25 or 30 percent by weight (optionally wherein the toughener has a phenol, amine, epoxide, or isocyante reactive end group reactive with epoxides);

(b) producing a three-dimensional intermediate (e.g., a flexible, collapsible or compressible intermediate) from the polymerizable liquid by an additive manufacturing process including irradiating the polymerizable liquid with light (e.g., by stereolithography, including bottom-up stereolithography such as continuous liquid interface production) to form a solid polymer scaffold from the first component and containing the second solidifiable component carried in the scaffold in unsolidified and/or uncured form, the intermediate having the same shape as, or a shape to be imparted to, the three-dimensional object; the irradiating under conditions in which the organic diluent chemically reacts (e.g., degrades, isomerizes, cross-reacts, or polymerizes (e.g., with a light polymerizable component), etc.) by an amount sufficient to increase the strength of the intermediate (e.g., reduce the flexibility, collapsibility or compressibility thereof, for example, as compared to a non-reactive diluent if that non-reactive diluent was, instead, included in the polymerizable liquid in an amount that would reduce the viscosity of the polymerizable liquid by a like amount);

(c) optionally washing the intermediate, and (d) concurrently with or subsequent to the producing step (b), further curing the second solidifiable component in the three-dimensional intermediate to form the three-dimensional object.

In some embodiments of the foregoing, the producing step (b) is carried out by: (i) providing a carrier and an optically transparent member having a build surface, the carrier and the build surface defining a build region therebetween; (ii) filling the build region with the polymerizable liquid, and (iii) irradiating the build region with light through the optically transparent member to form the solid polymer scaffold from the first component and also advancing the carrier and the build surface away from one another to form the three-dimensional intermediate.

In some embodiments of the foregoing, the further curing step (d) is carried out subsequent to the producing step (b), and optionally but preferably subsequent to the washing step (c).

In some embodiments of the foregoing, the further curing step (d) is carried out by heating, microwave irradiating, or both heating and microwave irradiating.

In some embodiments of the foregoing, the polymerizable liquid comprises: (a) light-polymerizable monomers and/or prepolymers that can participate in forming an intermediate object by stereolithography (preferably included in an amount of from 5, 10, or 20 percent by weight, to 50, 60, or 80 percent by weight); and (b) heat-polymerizable monomers and/or prepolymers (preferably included in an amount of from 5, 10 or 20 percent by weight, to 40, 50 or 60 percent by weight);

In some embodiments of the foregoing, the resin further comprises a hardener (e.g., included in an amount of at least 1, 5, or 10 percent by weight, up to 40 or 50 percent by weight; e.g., the hardener comprising a compound having amine, thiol, vinyl ether, maleimide, or allyl reactive end groups.

In some embodiments of the foregoing, the polymerizable liquid further comprises at least one photoinitiator (e.g., in an amount of from 0.1 to 1 or 5 percent by weight), optionally at least one dye (e.g., in an amount of 0.001 or 0.01 to 1 or 5 percent by weight), and optionally at least one filler (e.g., in an amount of 0.01 or 0.1 to 20 or 50 percent by weight).

In some embodiments of the foregoing, the second component comprises an epoxy or cyanate ester resin, preferably in an amount from 20 or 30 percent by weight to 50, 60 or 70 percent by weight.

In some embodiments of the foregoing, the diluent comprises N,N'-dimethylacrylamide, n-vinyl-2-pyrrolidone, n-vinyl formamide, n-vinyl caprolactam, acryloylmorpholine, or a combination of two or more thereof. In some embodiments of the foregoing, the diluent comprises N,N'-dimethylacrylamide. In some embodiments of the foregoing, the diluent comprises n-vinyl-2-pyrrolidone. In some embodiments of the foregoing, the diluent comprises n-vinyl formamide. In some embodiments of the foregoing, the diluent comprises n-vinyl caprolactam. In some embodiments of the foregoing, the diluent comprises acryloylmorpholine.

In some embodiments of the foregoing, the polymerizable liquid comprises a hardener (e.g., an amine hardener such as a diaminodiphenyl sulfone hardener), optionally but preferably with the organic diluent included in an amount sufficient to dissolve the hardener in the polymerizable liquid.

In some embodiments of the foregoing, the polymerizable liquid comprises a chain extender (e.g., a dihydric phenolic compound) (e.g., in an amount of from 5 or 10 to 20, 25 or 30 percent by weight), and optionally further comprises a chain extender catalyst (e.g., an onium salt such as a phosphonium salt) (e.g., in an amount of from 0.01, 0.05 or 0.1 to 2, 5 or 10 percent by weight).

A further aspect of the invention is a product produced from a process as described above (e.g., a polymer blend as described below, typically in the form of a three-dimensional object).

A further aspect of the invention is a polymer blend comprising a light polymerized first component and a heat polymerized second component, the polymer blend having a notched Izod Impact Strength of at least 50 J/m when measured in accordance with ASTMD256, and a heat deflection temperature of at least 100 degrees Centigrade when measured in accordance with ASTM D648.

In some embodiments of the foregoing, the polymer blend comprises a toughener (e.g., a core-shell rubber, a thermoplastic toughener, etc.), preferably in an amount of froth about 5 or 10 percent by weight to 20, 25 or 30 percent by weight.

In some embodiments of the foregoing, the heat polymerized second component comprises an epoxy or cyanate ester polymer, preferably in an amount from 20 or 30 percent by weight to 50, 60 or 70 percent by weight.

In some embodiments of the foregoing, the polymer blend is configured as a three-dimensional object, the object produced by the process of additive manufacturing (e.g., stereolithography, such as continuous liquid interface production).

A further aspect of the invention is a dual cure resin (e.g., a cyanate ester or epoxy resin) useful for making a three-dimensional object by stereolithography, comprising:

(a) light-polymerizable monomers and/or prepolymers that can participate in forming an intermediate object by stereolithography such as CLIP (e.g., included in an amount of from 1, 5, or 10 percent by weight, to 50, 60, or 80 percent by weight);

(b) heat-polymerizable monomers and/or prepolymers (e.g., included in an amount of from 5 or 10 percent by weight, to 50 or 60 percent by weight);

(c) a hardener (e.g., a compound having amine, thiol, vinyl ether, maleimide, or allyl reactive end groups) (e.g., included in an amount of at least 1, 5, or 10 percent by weight, up to 40 or 50 percent by weight); and (d) an organic diluent in a viscosity-reducing effective amount, optionally but preferably wherein the diluent solubilizes or dissolves the hardener in the resin; and (e) optionally, but in some embodiments preferably, a toughener (e.g., a core-shell rubber, a thermoplastic toughener, etc., including combinations thereof), preferably in an amount of from about 5 or 10 to 20, 25 or 30 percent by weight (optionally wherein the toughener has a phenol, amine, epoxide, or isocyante reactive end group reactive with epoxides).

In some embodiments of the foregoing, the hardener comprises a polyamine (e.g., a diamine hardener such as a diaminodiphenyl sulfone hardener), optionally but preferably with the organic diluent included in an amount sufficient to dissolve the hardener in the polymerizable liquid.

In some embodiments of the foregoing, the resin further comprises a chain extender (e.g., dihydric phenolic compound) (e.g., in an amount of from 5 or 10 to 20, 25 or 30 percent by weight), and optionally further comprises a chain extender catalyst (e.g., an onium salt such as a phosphonium salt) (e.g., in an amount of from 0.01, 0.05 or 0.1 to 2, 5 or 10 percent by weight).

In some embodiments of the foregoing, the diluent comprises N,N'-dimethylacrylamide, n-vinyl-2-pyrrolidone, n-vinyl formamide, n-vinyl caprolactam, acryloylmorpholine, or a mixture of two or more thereof. In some embodiments of the foregoing, the diluent comprises N,N'-dimethylacrylamide. In some embodiments of the foregoing, the diluent comprises n-vinyl-2-pyrrolidone. In some embodiments of the foregoing, the diluent comprises n-vinyl formamide. In some embodiments of the foregoing, the diluent comprises n-vinyl caprolactam. In some embodiments of the foregoing, the diluent comprises acryloylmorpholine.

In some embodiments of the foregoing, the resin further comprises at least one photoinitiator (e.g., in an amount of from 0.1 to 1 or 5 percent by weight), optionally at least one dye (e.g., in an amount of 0.001 or 0.01 to 1 or 5 percent by weight), and optionally at least one filler (e.g., in an amount of 0.01 or 0.1 to 20 or 50 percent by weight).

A further aspect of the invention is a method of making a three-dimensional object, comprising: (a) providing a resin (i.e., a polymerizable liquid) as described above; (b) producing by additive manufacturing (typically including light polymerization or irradiating with light, e.g., by stereolithography, including bottom-up stereolithography such as continuous liquid interface production) a three-dimensional intermediate (e.g., a flexible, compressible, or collapsible intermediate) from the dual cure resin, the intermediate having the same shape as, or a shape to be imparted to, the three-dimensional object; (c) optionally washing the intermediate object; and then (d) heating the intermediate (i.e., to a temperature at which the heat-polymerizable monomers and/or prepolymers polymerize) to produce the three-dimensional object.

In some embodiments of the foregoing, the irradiating causes the organic diluent to chemically react (e.g., degrade, isomerize, cross-react, or polymerize (e.g., with a light polymerizable component), etc.) by an amount sufficient to increase the strength of the intermediate (e.g., reduce the flexibility, compressibility or collapsibility thereof, for example, as compared to a non-reactive diluent if that non-reactive diluent was, instead, included in the polymerizable liquid in an amount that would reduce the viscosity of the polymerizable liquid by a like amount).

In some embodiments of the method, the light polymerizable monomers and/or prepolymers form a solid polymer scaffold during the stereolithography step (b), which scaffold degrades during the heating step (d) and forms a constituent necessary for the polymerization of the heat polymerizable monomers and/or prepolymers.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1:
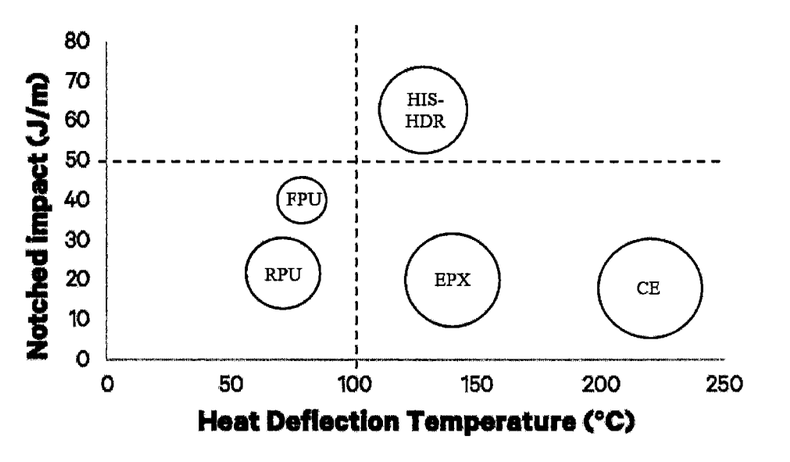
FIG. 1 shows a comparison of notched impact, HDT & Modulus (represented by dot size) between prior and new resin formulations. FPU=flexible polyurethane, RPU=rigid polyurethane; EPX=epoxy; CE=cyanate ester, HIS-HDR=high strength, heat deflection resistant.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

1. Resins.

Dual cure polymerizable liquids (or "resins") useful in additive manufacturing, particularly for stereolithography techniques such as continuous liquid interface production (CLIP) are known and described in, for example, J. Rolland et al., PCT Applications PCT/US2015/036893 (see also US Patent Application Pub. No. US 2016/0136889), PCT/US2015/036902 (see also US Patent Application Pub. No. US 2016/0137838), PCT/US2015/036924 (see also US Patent Application Pub. No. US 2016/0160077), and PCT/US2015/036946 (see also U.S. Pat. No. 9,453,142). In general, such resins can comprise: (a) light-polymerizable monomers and/or prepolymers that can form an intermediate object (typically in the presence of a photocatalyst); and (b) heat-polymerizable (or otherwise further polymerizable) monomers and/or prepolymers. As noted above, in the present invention these constituents are supplemented with an organic diluent as described above, and discussed further below.

A. Light-Polymerizable Monomers and/or Prepolymers.

Sometimes also referred to as "Part A" of the resin, these are monomers and/or prepolymers that can be polymerized by exposure to actinic radiation or light. This resin can have a functionality of 2 or higher (though a resin with a functionality of 1 can also be used when the polymer does not dissolve in its monomer). A purpose of Part A is to "lock" the shape of the object being formed or create a scaffold for the one or more additional components (e.g., Part B). Importantly, Part A is present at or above the minimum quantity needed to maintain the shape of the object being formed after the initial solidification during photolithography. In some embodiments, this amount corresponds to less than ten, twenty, or thirty percent by weight of the total resin (polymerizable liquid) composition.

Examples of suitable reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

An aspect of the solidification of Part A is that it provides a scaffold in which a second reactive resin component, termed "Part B," can solidify during a second step, as discussed further below.

B. Heat-Polymerizable Monomers and/or Prepolymers.

Sometimes also referred to as "Part B", these constituents may comprise, consist of or consist essentially of a mix of monomers and/or prepolymers that possess reactive end groups that participate in a second solidification reaction during or after the Part A solidification reaction. In general, for dual cure resins, examples of methods used to solidify Part B include, but are not limited to, contacting the object or scaffold to heat, water or water vapor, light at a different wavelength than that at which Part A is cured, catalysts, (with or without additional heat), evaporation of a solvent from the polymerizable liquid (e.g., using heat, vacuum, or a combination thereof), microwave irradiation, etc., including combinations thereof. In this case, heat curing of the "Part B" resins is preferred.

Examples of suitable reactive end group pairs suitable for Part B constituents, monomers or prepolymers include, but are not limited to: epoxy/amine, epoxy/hydroxyl, oxetane/amine, oxetane/alcohol, isocyanate*/hydroxyl, isocyanate*/amine, isocyanate/carboxylic acid, anhydride/amine, amine/carboxylic acid, amine/ester, hydroxyl/carboxylic acid, hydroxyl/acid chloride, amine/acid chloride, vinyl/Si—H (hydrosilylation), Si—Cl/hydroxyl, Si—Cl/amine, hydroxyl/aldehyde, amine/aldehyde, hydroxymethyl or alkoxymethyl amide/alcohol, aminoplast, alkyne/azide (also known as one embodiment of "Click Chemistry," along with additional reactions including thiolene, Michael additions, Diels-Alder reactions, nucleophilic substitution reactions, etc.), alkene/sulfur (polybutadiene vulcanization), alkene/peroxide, alkene/thiol, alkyne/thiol, hydroxyl/halide, isocyanate*/water (polyurethane foams), Si—OH/hydroxyl, Si—OH/water, Si—OH/Si—H (tin catalyzed silicone), Si—OH/Si—OH (tin catalyzed silicone), perfluorovinyl (coupling to form perfluorocyclobutane), etc., where isocyanate* includes protected isocyanates (e.g. oximes)), diene/dienophiles for Diels-Alder reactions, olefin metathesis polymerization, olefin polymerization using Ziegler-Natta catalysis, ring-opening polymerization (including ring-opening olefin metathesis polymerization, lactams, lactones, siloxanes, epoxides, cyclic ethers, imines, cyclic acetals, etc.), etc. As will be noted from the above, the "Part B" components generally comprise at least a pair of compounds, reactive with one another (e.g., a polyisocyanate, and a polyamine).

C. Additional Resin Ingredients.

Photoinitiators included in the polymerizable liquid (resin) can be any suitable photoinitiator, including type I and type II photoinitiators and including commonly used UV photoinitiators, examples of which include but are not limited to acetophenones (diethoxyacetophenone for example), phosphine oxides diphenyl(2,4,6-trimethylbenzoyl)phosphine oxide, phenylbis(2,4,6-trimethylbenzoyl) phosphine oxide (PPO), Irgacure 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Hardeners.

Any suitable hardener may be used as an additional component (see, e.g., U.S. Pat. Nos. 5,599,856; 6,656,979; 8,632,654; and 9,315,698). In some embodiments, the hardener can react with an epoxide. In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises a thiol or polythiol, an allyl or polyallyl (diallyls, triallyls); a maleimide; a vinyl ether, etc.

Particular examples of suitable thiol hardeners include, but are not limited to, 4,4'-dimercaptodiphenylether, 4,4'-dimercaptobiphenyl, trimethylolpropane tris(3-mercaptopropionate), pentaerythritol tetrakis(3-mercaptopropionate), 1,3,5-tris(3-mercaptopropyl)-1,3,5-triazine-2,4,6-trione, etc.

Examples of suitable allyls include, but are not limited to, allyl (meth)acrylate, 2,2'-diallylbisphenol A and triallyl-1,3,5-triazine-2,4,6-(1H,3H,5H)-trione.

In some embodiments, the hardener comprises a latent hardener (including mixtures thereof); that is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761). Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 4-aminobenzenesulfonamide, 1,2- or 1,3- or 1,4-benzenediamines, bis(4-aminophenyl)-1,4-diisopropylbenzene (e.g., EPON 1061 from Shell), bis(4-amino-3,5-dimethylphenyl)-1,4-diisopropylbenzene (e.g., EPON 1062 from Shell), bis (aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenylcyclohexane, methylenebis(2,6-diethylaniline) (e.g., LONZACURE® M-DEA from Lonza), methylenebis(2-isopropyl-6-methylaniline) (e.g. LONZACURE® M-MIPA from Lonza), methylenebis(2,6-diisopropylaniline) (e.g., LONZACURE® M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2',4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis(N,N-dimethylcarbamide) (see, e.g., U.S. Pat. No. 3,386,955); and aliphatic or cycloaliphatic diamines and polyamines if they are sufficiently unreactive. An example which may be mentioned here is polyetheramines, e.g., JEFFAMINE® 230 and 400. Aliphatic or cycloaliphatic diamines or polyamines whose reactivity has been reduced by steric and/or electronic influencing factors or/and are sparingly soluble or have a high melting point, e.g., JEFFLINK® 754 (Huntsman) or CLEARLINK® 1000 (Dorf Ketal) can also be used.

Chain Extenders.

In some embodiments, chain extenders may include those that can react with epoxides to grow linear chains. Particular examples include, but are not limited to, dihydric phenolic compounds such as bisphenol A, bisphenol S (4,4'-sulfonyldiphenol), bisphenol K, tetrabromobisphenol A, etc. See U.S. Pat. No. 4,594,219 to Berthram et al.

Chain Extender Catalysts.

In some embodiments, chain extender catalysts may include those that catalyze or promote the reaction of dihydric phenolic chain extenders with epoxides to grow linear chains. Examples of chain extender catalysts include, but are not limited to, onium salts, preferably phosphonium salts, and even more preferably phosphonium halides (e.g., tetrabutylphosphonium bromide, ethyl triphenylphosphonium iodide, etc.). See U.S. Pat. Nos. 4,767,832; 4,352,918; and 3,477,990, the disclosures of which are incorporated herein by reference. In some embodiments, the amount of the catalyst used may be from 0.01 to 10 percent, preferably from 0.05 to 5 percent, or from 0.1 to 2 percent, by weight of the composition.

Dyes/Non-Reactive Light Absorbers.

In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxypenyltriazine, and/or benzotriazole ultraviolet light absorber (e.g., Mayzo BLS® 1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers.

Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (μm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-Shell Rubbers.

Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 136, Kaneka Kane Ace MX 137, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof, and those sold by Dow under the designation Parloid.

Organic Diluents.

Diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 6,000, 5,000, 4,000, or 3,000 centipoise at 25 degrees Centigrade. Suitable examples of diluents include, but are not limited to, N,N'-dimethylacrylamide, n-vinyl-2-pyrrolidone, n-vinyl formamide, n-vinyl caprolactam, acryloylmorpholine, and mixtures thereof (i.e., mixtures of two or more thereof). The diluent may be included in the polymerizable liquid in any suitable amount, typically from 1, 5 or 10 percent by weight, up to about 30 or 40 percent by weight, or more.

2. Methods of Making.

Polymerizable liquids or resins as described herein are used to make three-dimensional objects in a first "light" cure (typically by additive manufacturing) which generates a "green" intermediate object, followed by a second heat cure of that intermediate object.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entireties.

In some embodiments, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). It is then further cured, preferably by heating (although further curing may in some embodiments be concurrent with the first cure, or may be by different mechanisms such as contacting to water, as described in U.S. Pat. No. 9,453,142 to Rolland et al.).

Heating may be active heating (e.g., in an oven, such as an electric, gas, solar oven or microwave oven, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

The present invention is explained in greater detail in the following non-limiting Examples, in which the following standards were used: HDT: ASTM D648; Tg DMA: ASTM E1640; Impact: ASTM D256; Tensile Test: ASTM D638, Type 5. Continuous liquid interface production was performed on a Carbon, Inc. M1 apparatus, available from Carbon, Inc., 1089 Mills Way, Redwood City, Calif. 94063 USA.

Example 1

Ten grams of a commercially available urethane acrylate (CN983), 10 grams of commercially available acrylate monomer (CN153), 40.5 grams of a Bisphenol F diglycidyl ether resin with core-shell rubber modifiers (Kaneka MX136), 12.5 grams of 4,4'-diaminodiphenyl sulfone (DDS), and 0.8 grams of phenylbis(2,4,6-trimethylbenzoyl) phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 1 below.

TABLE 1

| Material properties of Example 1 | |
|---|---|
| Tensile modulus (MPa) | 3000-3200 |
| Tensile strength at yield (MPa) | 84 |
| Tensile strength at break (MPa) | 84 |
| Elongation at yield (%) | 5.5 |
| Elongation at break (%) | 6.3 |
| Glass transition temperature (E', tanD) | 125, 135° C. |
| Izod impact strength, notched (J/m) | 57 |
| Heat deflection temperature | N/D |
| Viscosity (cP) | 450 |
| Green modulus | <10 MPa |

Comparative Example 1: Undissolved DDS

Ten grams of a commercially available urethane acrylate (CN983), 10 grams of commercially available acrylate monomer (CN153), 40.5 grams of a Bisphenol F diglycidyl ether resin with core-shell rubber modifiers (Kaneka MX136), 12.5 grams of 4,4'-diaminodiphenyl sulfone (DDS), and 0.8 grams of phenylbis(2,4,6-trimethylbenzoyl) phosphine oxide were mixed with 25.7 grams of tetrahydrofurfuryl methacrylate in a planetary centrifugal mixer to yield an inhomogeneous resin with suspended 4,4'-diaminodiphenylsulfone. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 2 below.

TABLE 2

| Material properties of Comparative Example 1 | |
| --- | --- |
| Tensile modulus (MPa) | |
| Tensile strength at yield (MPa) | |
| Tensile strength at break (MPa) | |
| Elongation at yield (%) | |
| Elongation at break (%) | |
| Glass transition temperature (E', tanD) | |
| Izod impact strength, notched (J/m) | 25 |
| Heat deflection temperature | |

Comparative Example 2: EPX 81

Ten and one half grams of a commercially available urethane acrylate (CN983), 10 grams of commercially available acrylate monomer (CN153), 40.5 grams of a Bisphenol F diglycidyl ether resin with core-shell rubber modifiers (Kaneka MX136), 12.7 grams of 4,4'-diaminodiphenyl sulfone, and 0.8 grams of phenylbis(2,4,6-trimethylbenzoyl) phosphine oxide were mixed with 25.7 grams of neopentyl glycol dimethacrylate in a planetary centrifugal mixer to yield an inhomogeneous resin with suspended 4,4'-diaminodiphenylsulfone. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 2a below.

TABLE 2a

| Material properties of Comparative Example 2 | |
| --- | --- |
| Tensile modulus (MPa) | 3300-3500 |
| Tensile strength at yield (MPa) | N/A |
| Tensile strength at break (MPa) | 88 |
| Elongation at yield (%) | N/A |
| Elongation at break (%) | 4.3 |
| Glass transition temperature (E', tanD) | 138, 148° C. |
| Izod impact strength, notched (J/m) | 21 |
| Heat deflection temperature | 140° C. |

Example 2

Ten grams of a commercially available urethane acrylate (CN983), 10 grams of commercially available acrylate monomer (CN153), 40.5 grams of a Bisphenol F diglycidyl ether resin with core-shell rubber modifiers (Kaneka MX267), 10.4 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 3 below.

TABLE 3

| Material properties of Example 2 | |
| --- | --- |
| Tensile modulus (MPa) | 2500-2700 |
| Tensile strength at yield (MPa) | 68 |
| Tensile strength at break (MPa) | 66 |
| Elongation at yield (%) | 7 |
| Elongation at break (%) | 9.4 |
| Glass transition temperature (E', tanD) | 120, 130° C. |
| Izod impact strength, notched (J/m) | 42 |
| Heat deflection temperature | N/D |
| Viscosity (cP) | 500 |
| Green Modulus | <10 MPa |

Example 3

Ten grams of a commercially available urethane acrylate (CN983), 10 grams of commercially available acrylate monomer (CN153), 40.5 grams of a Bisphenol F diglycidyl ether resin with core-shell rubber modifiers (Kaneka MX136), 13.8 grams of 4,4'-diaminodiphenyl sulfone, and 0.8 grams of phenylbis(2,4,6-trimethylbenzoyl) phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 4 below.

TABLE 4

| Material properties of Example 3 | |
| --- | --- |
| Tensile modulus (MPa) | 3000-3200 |
| Tensile strength at yield (MPa) | 83 |
| Tensile strength at break (MPa) | 78 |
| Elongation at yield (%) | 5.5 |
| Elongation at break (%) | 6.9 |
| Glass transition temperature (E', tanD) | 123, 133° C. |
| Izod impact strength, notched (J/m) | 53 |
| Heat deflection temperature | N/D |
| Viscosity (cP) | 600 |
| Green Modulus | <10 MPa |

Example 4

Twenty grams of a commercially available urethane acrylate (CN983), 10 grams of commercially available acrylate monomer (CN153), 32 grams of a Bisphenol F diglycidyl ether resin with core-shell rubber modifiers (Kaneka MX136), 10.2 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 5 below.

TABLE 5

Material properties of Example 4

| | |
|---|---|
| Tensile modulus (MPa) | 3150-3350 |
| Tensile strength at yield (MPa) | 88 |
| Tensile strength at break (MPa) | 87 |
| Elongation at yield (%) | 5.2 |
| Elongation at break (%) | 6.0 |
| Glass transition temperature (E', tanD) | 125, 135° C. |
| Izod impact strength, notched (J/m) | 49 |
| Heat deflection temperature | N/D |
| Viscosity (cP) | 700 |
| Green Modulus | 50 MPa |

Example 5

Ten grams of a commercially available urethane acrylate (CN983), 20 grams of commercially available acrylate monomer (CN153), 32 grams of a Bisphenol F diglycidyl ether resin with core-shell rubber modifiers (Kaneka MX136), 11.7 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 6 below.

TABLE 6

Material properties of Example 5

| | |
|---|---|
| Tensile modulus (MPa) | 3150-3350 |
| Tensile strength at yield (MPa) | 89 |
| Tensile strength at break (MPa) | 84 |
| Elongation at yield (%) | 5.4 |
| Elongation at break (%) | 8.2 |
| Glass transition temperature (E', tanD) | 127, 137° C. |
| Izod impact strength, notched (J/m) | 45 |
| Heat deflection temperature | N/D |
| Viscosity (cP) | 700 |
| Green Modulus | 30 MPa |

Example 6

Twenty grams of a commercially available urethane methacrylate (Exothane 10), 10 grams of commercially available acrylate monomer (CN153), 32 grams of a Bisphenol F diglycidyl ether resin with core-shell rubber modifiers (Kaneka MX136), 11.7 grams of 4,4'-diaminodiphenyl sulfone, and 0.8 grams of phenylbis(2,4,6-trimethylbenzoyl) phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 7 below.

TABLE 7

Material properties of Example 6

| | |
|---|---|
| Tensile modulus (MPa) | 3200-3300 |
| Tensile strength at yield (MPa) | 85 |
| Tensile strength at break (MPa) | 81 |
| Elongation at yield (%) | N/A |
| Elongation at break (%) | 5.2 |
| Glass transition temperature (E', tanD) | N/D |
| Izod impact strength, notched (J/m) | 36 |
| Heat deflection temperature | N/D |
| Viscosity (cP) | 650 |
| Green Modulus | 50 MPa |

Example 7

Ten grams of a commercially available urethane acrylate (CN983), 10 grams of commercially available acrylate monomer (CN153), 40.5 grams of a Bisphenol A diglycidyl ether resin with core-shell rubber modifiers (Kaneka MX153), 10.45 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 8 below.

TABLE 8

| Material properties of Example 7 | |
| --- | --- |
| Tensile modulus (MPa) | 2700-2800 |
| Tensile strength at yield (MPa) | 80 |
| Tensile strength at break (MPa) | 75 |
| Elongation at yield (%) | 5.8 |
| Elongation at break (%) | 8.1 |
| Glass transition temperature (E', tanD) | 138, 148° C. |
| Izod impact strength, notched (J/m) | 58 |
| Heat deflection temperature | N/D |
| Viscosity (cP) | 650 |
| Green Modulus | 700 MPa |

Example 8

Ten grams of a commercially available urethane acrylate (CN983), 10 grams of commercially available acrylate monomer (CN153), 40.5 grams of a Bisphenol A diglycidyl ether resin with core-shell rubber modifiers (Kaneka MX153), 10.45 grams of 3,3'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 9 below.

TABLE 9

| Material properties of Example 8 | |
| --- | --- |
| Tensile modulus (MPa) | 2850-2950 |
| Tensile strength at yield (MPa) | 80 |
| Tensile strength at break (MPa) | 70 |
| Elongation at yield (%) | 5.6 |
| Elongation at break (%) | 8.7 |
| Glass transition temperature (E', tanD) | 133, 143° C. |
| Izod impact strength, notched (J/m) | 55 |
| Heat deflection temperature | N/D |
| Viscosity (cP) | 450 |
| Green Modulus | 700 MPa |

Example 9

Ten grams of a commercially available urethane acrylate (CN983), 10 grams of commercially available acrylate monomer (CN153), 40.5 grams of a Bisphenol A diglycidyl ether resin with core-shell rubber modifiers (Kaneka MX153), 5.2 grams of 3,3'-diaminodiphenyl sulfone, 5.2 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 10 below.

TABLE 10

| Material properties of Example 9 | |
| --- | --- |
| Tensile modulus (MPa) | 2800-2900 |
| Tensile strength at yield (MPa) | 80 |
| Tensile strength at break (MPa) | 69 |
| Elongation at yield (%) | 5.8 |
| Elongation at break (%) | 10.6 |
| Glass transition temperature (E', tanD) | 135, 145° C. |
| Izod impact strength, notched (J/m) | 57 |
| Heat deflection temperature | 130° C. |
| Viscosity (cP) | 500 |
| Green Modulus | 700 MPa |

Example 10

Ten grams of a commercially available urethane acrylate (CN983), 10 grams of commercially available acrylate monomer (CN153), 36.8 grams of a Bisphenol A diglycidyl ether resin with core-shell rubber modifiers (Kaneka MX153), 5 grams phenol-terminated poly(ether sulfone) (Virantage VWR 10700), 4.8 grams of 3,3'-diaminodiphenyl sulfone, 4.8 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 11 below.

TABLE 11

| Material properties of Example 10 | |
| --- | --- |
| Tensile modulus (MPa) | 2850-2950 |
| Tensile strength at yield (MPa) | 78 |
| Tensile strength at break (MPa) | 70 |
| Elongation at yield (%) | 7 |
| Elongation at break (%) | 14.8 |
| Glass transition temperature (E', tanD) | 132, 144° C. |
| Izod impact strength, notched (J/m) | 66 |
| Heat deflection temperature | N/D |
| Viscosity (cP) | 3000 |
| Green Modulus | 750 MPa |

Example 11

Ten grams of a commercially available urethane acrylate (CN983), 10 grams of commercially available acrylate monomer (CN153), 35.5 grams of a Bisphenol A diglycidyl ether resin with core-shell rubber modifiers (Kaneka MX153), 5 grams epoxy oligomer (Araldite 7074), 4.8 grams of 3,3'-diaminodiphenyl sulfone, 4.8 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 12 below.

TABLE 12

Material properties of Example 11

| | |
|---|---|
| Tensile modulus (MPa) | 2900-3000 |
| Tensile strength at yield (MPa) | 81 |
| Tensile strength at break (MPa) | 69 |
| Elongation at yield (%) | 5.6 |
| Elongation at break (%) | 14.9 |
| Glass transition temperature (E', tanD) | 131, 143° C. |
| Izod impact strength, notched (J/m) | 63 |
| Heat deflection temperature | N/D |
| Viscosity (cP) | 1250 |
| Green Modulus | 650 MPa |

Example 12

Ten grams of a commercially available urethane acrylate (CN983), 10 grams of commercially available acrylate monomer (CN153), 36.8 grams of a Bisphenol A diglycidyl ether resin with core-shell rubber modifiers (Kaneka MX153), 10 grams epoxy oligomer (Araldite 7074), 4.8 grams of 3,3'-diaminodiphenyl sulfone, 4.8 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three-dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 13 below.

TABLE 13

Material properties of Example 12

| | |
|---|---|
| Tensile modulus (MPa) | 2850-2950 |
| Tensile strength at yield (MPa) | 82 |
| Tensile strength at break (MPa) | 67 |
| Elongation at yield (%) | 5.6 |
| Elongation at break (%) | 17.4 |
| Glass transition temperature (E', tanD) | 127, 140° C. |
| Izod impact strength, notched (J/m) | 63 |
| Heat deflection temperature | N/D |
| Viscosity (cP) | 2000 |
| Green Modulus | 750 MPa |

Example 13

Ten grams of a commercial available urethane acrylate (CN983), 10 grams of commercially available acrylate monomer (CN153), 35.5 grams of a Bisphenol A diglycidyl ether resin with core-shell rubber modifiers (Kaneka MX153), 12 grams 4,4'-sulfonyldiphenol, 4.5 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 14 below.

TABLE 14

Material properties of Example 13

| | |
|---|---|
| Tensile modulus (MPa) | 2750-2850 |
| Tensile strength at yield (MPa) | 79 |
| Tensile strength at break (MPa) | 68 |
| Elongation at yield (%) | 5.5 |
| Elongation at break (%) | 11.3 |
| Glass transition temperature (E', tanD) | 123, 137° C. |
| Izod impact strength, notched (J/m) | 71 |
| Heat deflection temperature | N/D |
| Viscosity (cP) | 1400 |
| Green Modulus | N/D |

Example 14

Ten grams of a commercially available urethane acrylate (CN983), 10 grams of commercially available acrylate monomer (CN153), 36.8 grams of a Bisphenol A diglycidyl ether resin with core-shell rubber modifiers (Kaneka MX153), 12 grams 4,4'-sulfonyldiphenol, 4.5 grams of 4,4'-diaminodiphenyl sulfone, 0.1 grams of tetrabutylphosphonium bromide, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three dimensional intermediate using continuous liquid interface production (CLIP) in continuous exposure mode, using a 385 nm LED projector with a light intensity of 9 mW/cm² at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 15 below.

TABLE 15

Material properties of Example 14

| | |
|---|---|
| Tensile modulus (MPa) | 2750-2850 |
| Tensile strength at yield (MPa) | 79 |
| Tensile strength at break (MPa) | 67 |
| Elongation at yield (%) | 5.6 |
| Elongation at break (%) | 13.6 |
| Glass transition temperature (E', tanD) | 125, 137° C. |
| Izod impact strength, notched (J/m) | 76 |
| Heat deflection temperature | N/D |
| Viscosity (cP) | 1400 |
| Green Modulus | N/D |

Example 15

Ten grams of a commercially available urethane acrylate (CN983), 10 grams of commercially available acrylate monomer (CN153), 35.5 grams of a Bisphenol A diglycidyl ether resin with core-shell rubber modifiers (Kaneka MX153), 14 grams of tetrabromobisphenol A, 6.75 grams of 4,4'-diaminodiphenyl sulfone, and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 16 below.

TABLE 16

Material properties of Example 15

| | |
|---|---|
| Tensile modulus (MPa) | 2900-3000 |
| Tensile strength at yield (MPa) | 79 |
| Tensile strength at break (MPa) | 70 |
| Elongation at yield (%) | 5.2 |
| Elongation at break (%) | 10.2 |
| Glass transition temperature (E', tanD) | 127, 140° C. |
| Izod impact strength, notched (J/m) | 62 |
| Heat deflection temperature | N/D |
| Viscosity (cP) | 860 |
| Green Modulus | N/D |

Example 16

Ten grams of a commercially available urethane acrylate (CN983), 10 grams of commercially available acrylate monomer (CN153), 40.5 grams of a Bisphenol A diglycidyl ether resin with core-shell rubber modifiers (Kaneka MX153), 5.22 grams of 3,3'-diaminodiphenyl sulfone, 5.22 grams of 4,4'-diaminodiphenyl sulfone, and 0.8 grams of phenylbis(2,4,6-trimethylbenzoyl)phosphine oxide were mixed with 25.7 grams of acryloylmorpholine in a planetary centrifugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 17 below.

TABLE 17

Material properties of Example 16

| | |
|---|---|
| Tensile modulus (MPa) | 2900-3000 |
| Tensile strength at yield (MPa) | 84 |
| Tensile strength at break (MPa) | 84 |
| Elongation at yield (%) | 5.5 |
| Elongation at break (%) | 6.8 |
| Glass transition temperature (E', tanD) | 132, 145° C. |
| Izod impact strength, notched (J/m) | 43 |
| Heat deflection temperature | N/D |
| Viscosity (cP) | 14,000 |
| Green Modulus | N/D |

Example 17

Ten grams of a commercially available urethane acrylate (CN983), 10 grams of commercially available acrylate monomer (CN153), 40.5 grams of a Bisphenol A diglycidyl ether resin with core-shell rubber modifiers (Kaneka MX153), 15 grams of 4,4'-sulfonyldiphenol, 2.3 grams of sulfanilamide, 0.05 grams tetrabutylphosphonium bromide and 0.8 grams of phenylbis(2,4,6-trimethylbenzoyl)phosphine oxide were mixed with 25.7 grams of N,N'-dimethylacrylamide in a planetary centrifugal mixer to yield a homogeneous resin. This resin was formed into a three dimensional intermediate using continuous liquid interface production (CLIP) in continuous exposure mode, using a 385 nm LED projector with a light intensity of 9 mW/cm$^2$ at a speed of 30 mm/hour. The formed material was cured in a convection oven at temperatures up to 220° C. to yield the desired product. The mechanical properties of dual cured products produced from such resins were evaluated by producing mechanical test samples in this manner, and are given in Table 18 below.

TABLE 18

Material properties of Example 17

| | |
|---|---|
| Tensile modulus (MPa) | 2600-2700 |
| Tensile strength at yield (MPa) | 73 |
| Tensile strength at break (MPa) | 60 |
| Elongation at yield (%) | 5.7 |
| Elongation at break (%) | 15.8 |
| Glass transition temperature (E', tanD) | 122, 136° C. |
| Izod impact strength, notched (J/m) | 66 |
| Heat deflection temperature | N/D |
| Viscosity (cP) | 850 |
| Green Modulus | N/D |

The foregoing is illustrative of the present invention, and is not to be construed as limiting thereof.

What is claimed is:

1. A method of forming a three-dimensional object, comprising:
   (a) providing a polymerizable liquid comprising a homogeneous mixture of (i) a light polymerizable first component, (ii) a second solidifiable component that is different from said first component, (iii) an organic diluent in an amount sufficient to reduce the viscosity of said polymerizable liquid; (iv) a toughener; and (v) an aromatic amine hardener, wherein said organic diluent is included in said polymerizable liquid in an amount sufficient to dissolve said aromatic amine hardener in said polymerizable liquid;
   (b) producing a three-dimensional intermediate from said polymerizable liquid by an additive manufacturing process including irradiating said polymerizable liquid with light to form a solid polymer scaffold from said first component and containing said second solidifiable component carried in said scaffold in unsolidified and/or uncured form, said intermediate having the same shape as, or a shape to be imparted to, said three-dimensional object;
   said irradiating under conditions in which said organic diluent chemically reacts;
   (c) optionally washing said intermediate, and
   (d) concurrently with or subsequent to said producing step (b), curing said second solidifiable component in said three-dimensional intermediate to form said three-dimensional object.

2. The method of claim 1, wherein said toughener comprises a core shell rubber.

3. The method of claim 1, wherein said producing step (b) is carried out by stereolithography.

4. The method of claim 1, wherein said producing step (b) is carried out by: (i) providing a carrier and an optically transparent member having a build surface, said carrier and said build surface defining a build region therebetween; (ii) filling said build region with said polymerizable liquid, and (iii) irradiating said build region with light through said optically transparent member to form said solid polymer scaffold from said first component and also advancing said carrier and said build surface away from one another to form said three-dimensional intermediate.

5. The method of claim 1, wherein said further curing step (d) is carried out subsequent to said producing step (b), and optionally subsequent to said washing step (c).

6. The method of claim 1, wherein said further curing step (d) is carried out by heating, microwave irradiating, or both heating and microwave irradiating.

7. The method of claim 1, wherein said polymerizable liquid comprises light-polymerizable monomers and/or prepolymers that can participate in forming the intermediate by stereolithography; and heat-polymerizable monomers and/or prepolymers.

8. The method of claim 1, wherein said aromatic amine hardener is selected from bis(4-aminophenyl) sulfone, bis(3-aminophenyl) sulfone, 4,4'-methylenedianiline, 4-aminobenzenesulfonamide, 1,2- or 1,3- or 1,4-benzenediamines, bis(4-aminophenyl)-1,4-diisopropylbenzene, bis(4-amino-3,5-dimethylphenyl)-1,4-diisopropylbenzene, bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenyl-cyclohexane, methylenebis(2,6-diethylaniline), methylenebis(2-isopropyl-6-methylaniline), methylenebis(2,6-diisopropylaniline), 4-aminodiphenylamine, diethyltoluenediamine, phenyl-4,6-diaminotriazine, lauryl-4,6-diaminotriazine, and any combination thereof.

9. The method of claim 1, said polymerizable liquid further comprising at least one photoinitiator, optionally at least one dye, and optionally at least one filler.

10. The method of claim 1, wherein said second solidifiable component comprises an epoxy or cyanate ester resin.

11. The method of claim 1, wherein said organic diluent comprises N,N'-dimethylacrylamide, n-vinyl-2-pyrrolidone, n-vinyl formamide, n-vinyl caprolactam, acryloylmorpholine, or a combination of two or more thereof.

12. The method of claim 1, wherein said polymerizable liquid further comprises a chain extender, and optionally further comprises a chain extender catalyst.

13. The method of claim 1, wherein said three-dimensional object is rigid.

14. The method of claim 1, wherein the light polymerizable first component comprises light polymerizable monomers and/or prepolymers that comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

15. The method of claim 1, wherein the second solidifiable component comprises heat polymerizable monomers and/or prepolymers that comprise reactive end groups selected from the group consisting of: epoxy/amine, epoxy/hydroxyl, oxetane/amine, oxetane/alcohol, isocyanate/hydroxyl, isocyanate/amine, isocyanate/carboxylic acid, cyanate ester, anhydride/amine, amine/carboxylic acid, amine/ester, hydroxyl/carboxylic acid, hydroxyl/acid chloride, amine/acid chloride, vinyl/Si—H, Si—Cl/hydroxyl, Si—Cl/amine, hydroxyl/aldehyde, amine/aldehyde, hydroxymethyl or alkoxymethyl amide/alcohol, aminoplast, alkyne/azide, click chemistry reactive groups, alkene/sulfur, alkene/thiol, alkyne/thiol, hydroxyl/halide, isocyanate/water, Si—OH/hydroxyl, Si—OH/water, Si—OH/Si—H, Si—OH/Si—OH, perfluorovinyl, diene/dienophiles, olefin metathesis polymerization groups, olefin polymerization groups for Ziegler-Natta catalysis, and ring-opening polymerization groups and mixtures thereof.

16. The method of claim 1, wherein said light polymerizable first component comprises light polymerizable monomers and/or prepolymers that form the solid polymer scaffold by stereolithography in said producing step (b), wherein the second solidifiable component comprises heat polymerizable monomers and/or prepolymers, wherein the further curing step (d) comprises heating the intermediate, and wherein the scaffold degrades during said heating and forms a constituent necessary for the polymerization of said heat polymerizable monomers and/or prepolymers.

17. The method of claim 1, wherein said producing step (b) is carried out by continuous liquid interface production.

18. The method of claim 1, wherein said light polymerizable first component comprises an acrylate and/or a methacrylate; said second solidifiable component comprises an epoxy resin; said organic diluent comprises N,N'-dimethylacrylamide, n-vinyl-2-pyrrolidone, n-vinyl formamide, n-vinyl caprolactam, acryloylmorpholine, or a combination of two or more thereof; said toughener comprises a core shell rubber; and said aromatic amine hardener comprises bis(4-aminophenyl) sulfone and/or bis(3-aminophenyl) sulfone.

19. The method of claim 1, wherein said three-dimensional object has a notched Izod Impact Strength of at least 50 J/m when measured in accordance with ASTM D256 and a heat deflection temperature of at least 100 centigrade when measured in accordance with ASTM D648.

* * * * *